United States Patent
Kim et al.

(10) Patent No.: US 11,249,643 B2
(45) Date of Patent: Feb. 15, 2022

(54) ELECTRONIC DEVICE FOR DISPLAYING LIST OF EXECUTABLE APPLICATIONS ON SPLIT SCREEN AND OPERATING METHOD THEREOF

(71) Applicant: Samsung Electronics Co., Ltd., Gyeonggi-do (KR)

(72) Inventors: Juwhan Kim, Gyeonggi-do (KR); Dasom Kim, Gyeonggi-do (KR); Joonhwan Kim, Gyeonggi-do (KR); Jieun Yang, Gyeonggi-do (KR); Sangeun Lee, Gyeonggi-do (KR); Kyungwha Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/574,901

(22) Filed: Sep. 18, 2019

(65) Prior Publication Data
US 2020/0133482 A1 Apr. 30, 2020

(30) Foreign Application Priority Data
Oct. 26, 2018 (KR) .......................... 10-2018-0129267

(51) Int. Cl.
*G06F 3/0488* (2013.01)
*G06F 3/04886* (2022.01)
(Continued)

(52) U.S. Cl.
CPC ........ *G06F 3/04886* (2013.01); *G06F 3/0482* (2013.01); *G06F 3/04817* (2013.01);
(Continued)

(58) Field of Classification Search
CPC ............... G06F 3/04886; G06F 3/0482; G06F 3/04817; G06F 3/04897; G06F 2203/04803; G09G 5/14
See application file for complete search history.

(56) References Cited

U.S. PATENT DOCUMENTS 9,632,653 B2  4/2017  Ko et al.
RE47,577 E *  8/2019  Lee ...................... G06F 16/951
(Continued)

FOREIGN PATENT DOCUMENTS

KR  1020140136794  12/2014
KR    20150081040   7/2015
(Continued)

OTHER PUBLICATIONS

International Search Report dated Dec. 9, 2019 issued in counterpart application No. PCT/KR2019/011016, 8 pages.
(Continued)

*Primary Examiner* — Kieu D Vu
*Assistant Examiner* — Alvaro R Calderon, IV
(74) *Attorney, Agent, or Firm* — The Farrell Law Firm, P.C.

(57) ABSTRACT

A method and electronic device are provided for displaying a list of executable applications on a split screen. The electronic device includes a display, a memory, and a processor. The memory stores a history including information indicating split-screen areas in which scenes associated with executed applications are respectively displayed in a split-screen mode. In response to execution of an application, the processor displays a first scene associated with the executed application on the display. In response to receiving a signal for entry into the split-screen mode, the processor identifies a first split-screen area for displaying a reduced scene of the first scene, and identifies second and third split-screen areas obtained by dividing a remaining area of the display, other than the first split-screen area, generates a first list of applications, based on the history, and displays the first list in the second split-screen area.

8 Claims, 10 Drawing Sheets

(51) Int. Cl.
*G06F 3/0482* (2013.01)
*G06F 3/04817* (2022.01)
*G09G 5/14* (2006.01)
*G06F 3/0489* (2022.01)

(52) U.S. Cl.
CPC .......... *G06F 3/04897* (2013.01); *G09G 5/14* (2013.01); *G06F 2203/04803* (2013.01)

(56) References Cited

U.S. PATENT DOCUMENTS

| | | | | |
|---|---|---|---|---|
| 2009/0019383 | A1* | 1/2009 | Riley | G06Q 10/10 715/764 |
| 2010/0053081 | A1* | 3/2010 | Jee | G06F 1/1647 345/157 |
| 2010/0079392 | A1 | 4/2010 | Chiang et al. | |
| 2011/0107272 | A1* | 5/2011 | Aguilar | G06F 3/04883 715/853 |
| 2012/0060109 | A1* | 3/2012 | Han | G09G 5/14 715/769 |
| 2012/0062688 | A1* | 3/2012 | Shen | G06F 9/451 348/14.03 |
| 2012/0072871 | A1* | 3/2012 | Seo | H04N 21/4312 715/838 |
| 2012/0304092 | A1* | 11/2012 | Jarrett | G06F 3/04817 715/765 |
| 2012/0317501 | A1* | 12/2012 | Milou | G06Q 10/101 715/753 |
| 2013/0083059 | A1* | 4/2013 | Hwang | G06F 11/323 345/629 |
| 2013/0097560 | A1* | 4/2013 | Park | G06F 3/04817 715/811 |
| 2013/0120295 | A1* | 5/2013 | Kim | G06F 3/0481 345/173 |
| 2013/0120447 | A1* | 5/2013 | Kim | G06F 3/0481 345/629 |
| 2013/0300684 | A1* | 11/2013 | Kim | G06F 3/0481 345/173 |
| 2013/0305184 | A1* | 11/2013 | Kim | G06F 3/04886 715/781 |
| 2014/0062925 | A1* | 3/2014 | Park | G06F 3/04883 345/173 |
| 2014/0089833 | A1* | 3/2014 | Hwang | G06F 3/0488 715/769 |
| 2014/0149931 | A1* | 5/2014 | Miki | G06F 3/0481 715/803 |
| 2014/0157163 | A1* | 6/2014 | Strutin-Belinoff | G06F 3/04883 715/769 |
| 2014/0164957 | A1* | 6/2014 | Shin | G06F 3/0481 715/753 |
| 2014/0282222 | A1* | 9/2014 | Eim | G06F 3/0482 715/783 |
| 2014/0282231 | A1* | 9/2014 | Foreman | G06F 9/451 715/792 |
| 2014/0325428 | A1* | 10/2014 | Lee | G06F 3/0488 715/781 |
| 2014/0325431 | A1* | 10/2014 | Vranjes | G06F 9/451 715/788 |
| 2014/0351748 | A1* | 11/2014 | Xia | G06F 3/0481 715/798 |
| 2015/0067579 | A1* | 3/2015 | Jeong | G06F 3/0481 715/781 |
| 2015/0067588 | A1* | 3/2015 | Shim | G06F 3/0481 715/790 |
| 2015/0143253 | A1* | 5/2015 | Kamiyama | G06F 3/0481 715/745 |
| 2015/0199085 | A1* | 7/2015 | Churchill | G06F 16/24 715/739 |
| 2015/0338888 | A1* | 11/2015 | Kim | G06F 3/04886 345/156 |
| 2016/0062552 | A1* | 3/2016 | Jeong | G06F 3/0488 715/788 |
| 2016/0071491 | A1 | 3/2016 | Berryman | |
| 2016/0139685 | A1* | 5/2016 | Yang | G06F 3/1446 345/173 |
| 2016/0191980 | A1* | 6/2016 | Yu | H04N 5/44591 725/40 |
| 2016/0202852 | A1* | 7/2016 | Park | G06F 3/04886 715/781 |
| 2016/0210041 | A1* | 7/2016 | Yang | G06F 3/04886 |
| 2016/0378270 | A1* | 12/2016 | Lee | G06F 3/0481 715/788 |
| 2017/0039291 | A1* | 2/2017 | Singh | H04L 67/42 |
| 2017/0109037 | A1* | 4/2017 | Seo | G06F 3/0482 |
| 2017/0286042 | A1* | 10/2017 | Lee | G06F 3/14 |
| 2017/0300194 | A1 | 10/2017 | Lee | |
| 2017/0322709 | A1* | 11/2017 | Chen | G06F 3/04886 |
| 2018/0039382 | A1 | 2/2018 | Jeong et al. | |
| 2018/0052369 | A1 | 2/2018 | Ko et al. | |
| 2018/0081538 | A1* | 3/2018 | Kim | G06F 3/04886 |
| 2018/0356972 | A1* | 12/2018 | Wang | G06F 3/04845 |
| 2019/0340964 | A1* | 11/2019 | Kwon | G06F 1/1643 |
| 2020/0027425 | A1* | 1/2020 | Lee | G06F 3/0416 |

FOREIGN PATENT DOCUMENTS

| | | |
|---|---|---|
| KR | 20160088631 | 7/2016 |
| WO | WO 2014/165976 | 10/2014 |

OTHER PUBLICATIONS

European Search Report dated Jul. 15, 2021 issued in counterpart application No. 19874998.8-1203, 9 pages.

* cited by examiner

FIG. 2

PROGRAM 200 — 140, 146

APPLICATIONS 144

- HOME 251
- DIALER 253
- SMS/MMS 255
- IM 257
- BROWSER 259
- CAMERA 261
- ALARM 263
- CONTACT 265
- VOICE RECOGNITION 267
- EMAIL 269
- CALENDAR 271
- MEDIA PLAYER 273
- ALBUM 275
- WATCH 277
- HEALTH 279
- ENVIRONMENT INFORMATION 281

MIDDLEWARE 144

- APPLICATION MANAGER 201
- WINDOW MANAGER 203
- MULTIMEDIA MANAGER 205
- RESOURCE MANAGER 207
- POWER MANAGER 209
- DATABASE MANAGER 211
- PACKAGE MANAGER 213
- CONNECTIVITY MANAGER 215
- NOTIFICATION MANAGER 217
- LOCATION MANAGER 219
- GRAPHIC MANAGER 221
- SECURITY MANAGER 223
- TELEPHONY MANAGER 225
- VOICE RECOGNITION MANAGER 227

OPERATING SYSTEM 142

ELECTRONIC DEVICE FOR DISPLAYING LIST OF EXECUTABLE APPLICATIONS ON SPLIT SCREEN AND OPERATING METHOD THEREOF

CROSS-REFERENCE TO RELATED APPLICATION(S)

This application is based on and claims priority under 35 U.S.C. § 119 to Korean Patent Application No. 10-2018-0129267, filed on Oct. 26, 2018, in the Korean Intellectual Property Office, the entire disclosure of which is incorporated herein by reference.

BACKGROUND

1. Field

The disclosure relates generally to a method and electronic device for displaying a list of executable applications on a split screen.

2. Description of Related Art

With the growth of related technologies, a great variety of electronic devices, such as a smart phone, a tablet personal computer (PC), a portable multimedia player (PMP), a personal digital assistant (PDA), a laptop PC, and a wearable device, are widely being used.

Various electronic devices having a large-sized display have been recently popularized, and also various modes for utilizing such large displays have been implemented. One of currently implemented modes is a split-screen mode. Contrary to a full-screen mode in which the entire screen of the large display displays a scene of a single application, in the split-screen mode, screen of the large display may be divided into a plurality of split-screen areas, wherein scenes of different applications are displayed respectively in the split-screen areas.

The split-screen mode can effectively and simultaneously provide various information on the large display and also provide various scenes of different applications in the split-screen areas. Therefore, the split-screen mode can increase the usability of and workability in an electronic device having a large display.

When an electronic device shifts from a full-screen mode to a split-screen mode, a scene being displayed in the full-screen mode is often reduced in size and re-displayed in one of the split-screen areas. In addition, the electronic device may display a list of executable applications in the other split-screen areas so that the user can select applications to be executed in the split-screen areas. The list of applications may arrange the applications based on a frequently of use over a certain period of time.

A user may tend to execute different applications in the respective individual split-screen areas, while executing a specific application in a specific split-screen area only. Nevertheless, the list of applications may contain some application that are not used in a specific split-screen area. This may cause a problem in that the user has to perform a troublesome procedure for finding a desired application to be executed.

SUMMARY

Accordingly, the disclosure is designed to address at least the problems and/or disadvantages described above and to provide at least the advantages described below.

In accordance with an aspect of the disclosure, an electronic device is provided, which includes a display; a memory that stores a history including information indicating split-screen areas in which scenes associated with executed applications are respectively displayed in a split-screen mode; and a processor configured to: in response to execution of an application, display a first scene associated with the executed application on the display, in response to receiving a signal for entry into the split-screen mode, identify a first split-screen area for displaying a reduced scene of the first scene, and identify a second split-screen area and a third split-screen area obtained by dividing a remaining area of the display, other than the first split-screen area, generate a first list of applications, based on the history, and display the first list in the second split-screen area.

In accordance with another aspect of the disclosure, a method is provided for operating an electronic device, which includes, in response to execution of an application, displaying a first scene associated with the executed application on a display; in response to receiving a signal for entry into a split-screen mode, identifying a first split-screen area for displaying a reduced scene of the first scene, and identifying a second split-screen area and a third split-screen area obtained by dividing a remaining area of the display, other than the first split-screen area; generating a first list of applications, based on a history including information indicating split-screen areas in which scenes associated with executed applications are respectively displayed in the split-screen mode; and displaying the first list in the second split-screen area.

BRIEF DESCRIPTION OF THE DRAWINGS

The above and other aspects, features, and advantages of certain embodiments of the disclosure will be more apparent from the following description taken in conjunction with the accompanying drawing, in which:

FIG. 2 illustrates a program according to an embodiment;

DETAILED DESCRIPTION

Various embodiments of the disclosure will now be described in detail with reference to the accompanying drawings. In the following description, specific details such as detailed configurations and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
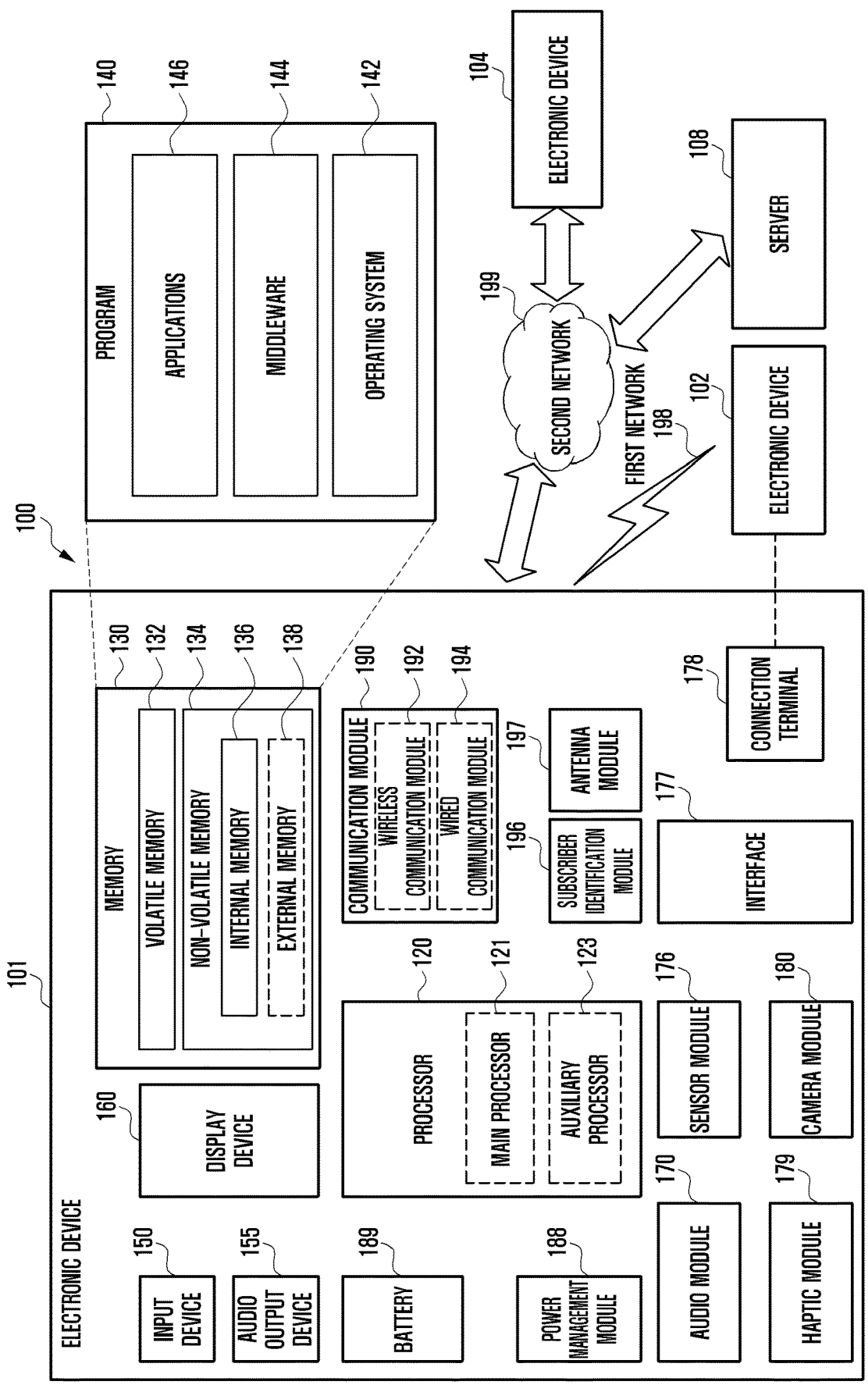
FIG. 1 illustrates an electronic device in a network environment according to an embodiment.

FIG. 1 illustrates an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 and/or a server 108 via a second network 199 (e.g., a long-range wireless communication network). The electronic device 101 may communicate with the electronic device 104 via the server 108.

The electronic device 101 includes a processor 120, memory 130, an input device 150, a sound (audio) output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101.

Some of the components may be implemented as single integrated circuitry. For example, the sensor module 176 (e.g., a fingerprint sensor, an iris sensor, or an illuminance sensor) may be embedded in the display device 160 (e.g., a display).

The processor 120 may execute software (e.g., a program 140) to control at least one component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

The processor 120 includes a main processor 121 (e.g., a central processing unit (CPU) or an application processor (AP)) and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may consume less power than the main processor 121, or may be specific to a specified function. The auxiliary processor 123 may be implemented separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121, while the main processor 121 is in an inactive (e.g., sleep) state, or together with the main processor 121, while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by other component (e.g., the processor 120) of the electronic device 101, from the outside (e.g., a user) of the electronic device 101. The input device 150 may include a microphone, a mouse, a keyboard, or a digital pen (e.g., a stylus pen).

The sound (audio) output device 155 may output sound signals to the outside of the electronic device 101. The sound output device 155 may include a speaker or a receiver. The speaker may be used for general purposes, such as playing multimedia or playing record, and the receiver may be used for incoming calls. The receiver may be implemented separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus, which may be recognized by a user via his tactile sensation or kinesthetic sensation. The haptic module 179 may include a motor, a piezoelectric element, and/or an electric stimulator.

The camera module 180 may capture a still image or moving images. The camera module 180 may include one or more lenses, image sensors, image signal processors, and/or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell, which is not rechargeable, a secondary cell, which is rechargeable, and/or a fuel cell.

The communication module 190 may support the establishment of a direct (e.g., wired) communication channel or a wireless communication channel between the electronic device 101 and the electronic device 102, the electronic device 104, or the server 108 and perform communication via the established communication channel. The communication module 190 may include one or more communication processors that are operable independently from the processor 120 (e.g., the AP) and supports a direct communication or a wireless communication. The communication module 190 includes a wireless communication module 192 (e.g., a cellular communication module, a short-range wireless communication module, or a global navigation satellite system (GNSS) communication module) and a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi-components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)).

The antenna module 197 may include a plurality of antennas, wherein at least one antenna appropriate for a communication scheme used in the communication network, such as the first network 198 or the second network 199, may be selected from the plurality of antennas by the communication module 190. The signal or the power may then be transmitted or received between the communication module 190 and the external electronic device via the selected at least one antenna. Another component, other than the radiating element, e.g., a radio frequency integrated circuit (RFIC), may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2 illustrates a program according to an embodiment.

Referring to FIG. 2, the program 140 includes an OS 142 to control one or more resources of the electronic device 101, middleware 144, or an application 146 executable in the OS 142. The OS 142 may include Android™, iOS™, Windows™, Symbian™, Tizen™, or Bade™. At least part of the program 140 may be pre-loaded on the electronic device 101 during manufacture, or may be downloaded from or updated by the electronic device 102 or 104, or the server 108 during use by a user.

The OS 142 may control management (e.g., allocating or deallocation) of one or more system resources (e.g., a processor, a memory, or a power source) of the electronic device 101. The OS 142, additionally or alternatively, may include one or more driver programs to drive other hardware devices of the electronic device 101, such as the input device 150, the sound output device 155, the display device 160, the audio module 170, S the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 includes, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, and a voice recognition manager 227.

The application manager 201 may manage the life cycle of the application 146. The window manager 203 may manage one or more graphical user interface (GUI) resources that are used on a screen. The multimedia manager 205 may identify one or more formats to be used to play media files, and may encode or decode a corresponding one of the media files using a codec appropriate for a corresponding format selected from the one or more formats. The resource manager 207 may manage the source code of the application 146 or a memory space of the memory 130. The power manager 209 may manage the capacity, temperature, or power of the battery 189, and determine or provide related information to be used for the operation of the electronic device 101 based at least in part on corresponding information of the capacity, temperature, or power of the battery 189. The power manager 209 may interwork with a basic input/output system (BIOS) of the electronic device 101.

The database manager 211 may generate, search, or change a database to be used by the application 146. The package manager 213 may manage installation or update of an application that is distributed in the form of a package file. The connectivity manager 215 may manage a wireless connection or a direct connection between the electronic device 101 and the external electronic device. The notification manager 217 may provide a function to notify a user of an occurrence of a specified event (e.g., an incoming call, message, or alert). The location manager 219 may manage locational information on the electronic device 101. The graphic manager 221 may manage one or more graphic effects to be offered to a user or a user interface related to the one or more graphic effects.

The security manager 223 may provide system security or user authentication. The telephony manager 225 may manage a voice call function or a video call function provided by the electronic device 101. The voice recognition manager 227 may transmit a user's voice data to the server 108, and receive, from the server 108, a command corresponding to a function to be executed on the electronic device 101 based at least in part on the voice data, or text data converted based at least in part on the voice data. The middleware 244 may dynamically delete existing components or add new components. At least part of the middleware 144 may be included as part of the OS 142 or may be implemented as another software separate from the OS 142.

The application 146 includes, for example, home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. The application 146 may further include an information exchanging application that supports information exchange between the electronic device 101 and the external electronic device. The information exchange application may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
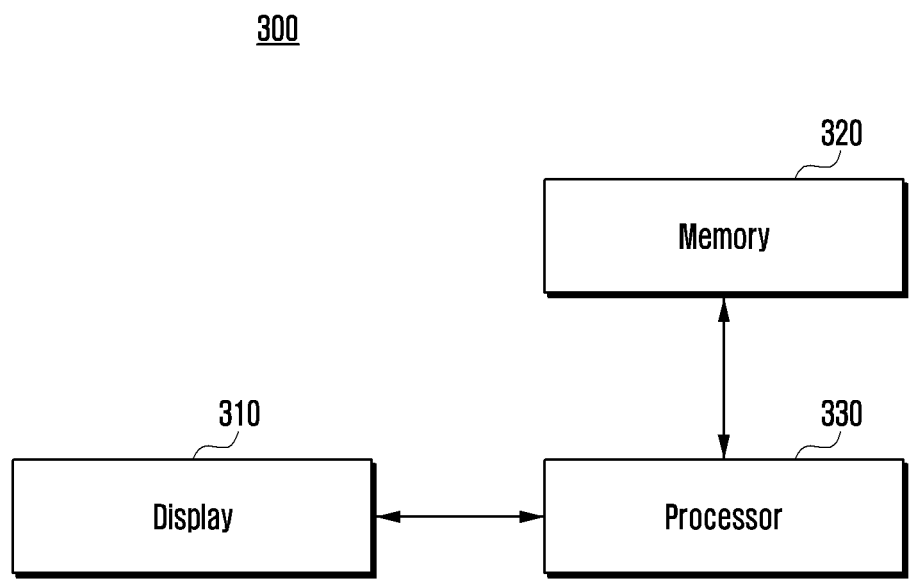
FIG. 3 illustrates an electronic device according to an embodiment.

FIG. 3 illustrates an electronic device according to an embodiment.

Referring to FIG. 3, an electronic device 300 includes a display 310, a memory 320, and a processor 330.

The display 310 may display various scenes of various applications under the control of the processor 330. The display 310 may support a full-screen mode for fully displaying a scene of a single application without dividing the entire screen of the display, and a split-screen mode for dividing the entire screen of the display into a plurality of split-screen areas and respectively displaying scenes of different applications in the split-screen areas. The display 310 may be formed of a flexible material.

The display 310 may display scenes of different applications in different split-screen areas, e.g., a first split-screen area, a second split-screen area, and a third split-screen area, respectively. The sizes of the split-screen areas may be different from each other. The number of and the sizes of the split-screen areas may vary according to a designer's intention.

The memory 320 may store a history of using the electronic device 300 by a user of the electronic device 300 in the split-screen mode. Specifically, this history may include information indicating which split-screen area among the split-screen areas has been used for displaying a scene of an executed application in the split-screen mode. For example, when the first split-screen area, the second split-screen area, and the third split-screen area are available in the split-screen mode, the processor 330 may generate and store in the memory 320 a history including information of applications executed in the first split-screen area, information of applications executed in the second split-screen area, and information of applications executed in the third split-screen area.

The history may be stored in a format as shown in Table 1 below.

TABLE 1

| Split-Screen Area Information | Executable Applications |
| --- | --- |
| 1$^{st}$ split-screen area | document editing application, image editing application, web browser |
| 2$^{nd}$ split-screen area | calculator, messenger application, social network service (SNS) application |
| 3$^{rd}$ split-screen area | image viewer application, video playback application, music player application |

The history may be stored in any one of a variety of formats other than the format shown in Table 1.

The memory 320 may store a history generated by the processor 330 tracking a user's usage history for a predetermined period of time. The history may be deleted from the memory 320 after a given period of time and/or when a newly generated history is stored by the processor 330.

The processor 330 may display a first scene of an application in response to execution of the application. The first scene may refer to a scene displayed in the full-screen mode.

The processor 330 may receive a user input requesting entry into the split-screen mode and then control the display 310 to display scenes of different applications in a plurality of split-screen areas, respectively. For convenience of description, it is assumed that the split-screen mode respectively displays different scenes in three split-screen areas, i.e., the first split-screen area (e.g., 410 in FIG. 4B), the second split-screen area (e.g., 420 in FIG. 4B), and the third split-screen area (e.g., 430 in FIG. 4B). As described above, the number of and the sizes of the split-screen areas may vary according to a designer's intention.

The first split-screen area may refer to a split-screen area where a resized first scene, i.e., a scene reduced from the first scene displayed in the full-screen mode, is displayed. The second and third split-screen areas may refer to split-screen areas generated by dividing the remaining area of the display 310.

The processor 330 may control the display 310 to display the reduced first scene in the first split-screen area.

The processor 330 may receive a user input requesting a display of a first list of applications executable in the second split-screen area. In response to the received user input, the processor 330 may generate the first list and control the display 310 to display the generated first list.

The processor 330 may generate the first list, based on the above-described history stored in the memory 320. Specifically, based on the information, which is contained in the history, indicating which split-screen area among the split-screen areas has been used for displaying a scene of an executed application in the split-screen mode, the processor 330 may generate the first list. For example, based on the history, the processor 330 may identify a particular number of applications that have been used for relatively long times in the second split-screen area. Then, the processor 330 may generate the first list to indicate and arrange these identified applications.

As another example, the processor 330 may identify a particular number of applications that are frequently used in the second split-screen area, based on the history, and then generate the first list to indicate and arrange these applications.

As yet another example, the processor 330 may identify a particular number of applications that were recently used in the second split-screen area, based on the history, and then generate the first list to indicate and arrange these applications.

The processor 330 may receive a user input requesting a display of a second list of applications executable in the third split-screen area. In response to the received user input, the processor 330 may generate the second list and control the display 310 to display the generated second list.

The processor 330 may generate the second list, based on the above-described history stored in the memory 320. Specifically, based on the information in the history, indicating which split-screen area among the split-screen areas has been used for displaying a scene of an executed application in the split-screen mode, the processor 330 may generate the second list. For example, based on the history, the processor 330 may identify a particular number of applications that have been used for a relatively long time, most frequently, or most recently in the third split-screen area, and then generate the second list to indicate and arrange these identified applications.

By considering the history of the user's application usage in the split-screen mode as described above, the processor 330 may generate and display a list of applications (e.g., the first list and the second list) that are likely to be used in each of the split-screen areas. Therefore, a user who tends to execute the same applications in certain split-screen areas may easily find and execute a desired application in a desired split-screen area.

There is no limit to the format for displaying the first list in the second split-screen area or for displaying the second list in the third split-screen area. For example, each of the first and second lists may be displayed as a collection of icons indicating applications. As another example, each of the first and second lists may be displayed as a collection of text indicating applications.

In each of the first and second lists, applications may be arranged based on at least one of the amount of an executed time of each application, the frequency of execution of each application, or the most recent execution of each application. For example, an application executed for a longer time may have a higher priority of being arranged in the list, a more frequently executed application may have a higher priority of being arranged in the list, or a more recently executed application may have a higher priority of being arranged in the list.

Considering a user who tends to execute applications regardless of the positions of the split-screen areas, a third list may be generated by combining the first and second lists and displayed in both the second split-screen area and the third split-screen area.

The processor 330 may identify all applications contained in each of the first and second lists, and count the number of particular applications contained in both the first list and the second list. Based on the counted number, the processor 330 may determine whether to generate the third list combining the first list and the second list.

When the number of particular applications contained in both the first list and the second list is greater than or equal to a predetermined value, this may indicate that the user tends to execute applications regardless of the positions of the split-screen areas. Therefore, in this case, the processor 330 may generate the third list by combining the first and second lists and display the third list in each of the second and third split-screen areas.

When the number of applications contained in both the first list and the second list is smaller than the predetermined value, this may indicate that the user tends to execute applications in consideration of the positions of the split-screen areas. Therefore, in this case, the processor 330 may determine not to generate the third list and display the first and second lists in the second and third split-screen areas, respectively.

Alternatively, when the number of particular applications contained in both the first list and the second list is greater than the predetermined value, the processor 330 may generate the third list, and when this number is smaller than or equal to the predetermined number, the processor 330 may determine not to generate the third list.

Alternatively, when determining whether to generate the third list, the processor 330 may use another criterion or rule. For example, a value obtained by dividing the number of particular applications contained in both the first list and the second list by the number of all applications contained in each list may be used to determine whether to generate the third list.

The processor 330 may receive a user input for selecting one of applications contained in the list (e.g., the first list, the second list, or the third list) of applications to be displayed in the second split-screen area and/or the third split-screen area, and then execute the selected application. In addition, the processor 330 may control the display 310 to display a scene of the selected application in the split-screen area where the list containing the selected application has been displayed.

Information of applications contained in the history stored in the memory 320 may include application types. The application types may be distinguished according to the kind of task using each application. For example, the application types may include a document editing application, an image editing application, a web browser, a calculator, a messenger application, an SNS application, an image viewer application, a video playback application, a music player application, etc., as shown in Table 1 above.

The processor 330 may generate the first list and/or the second list, based on the application types recorded in the history. For example, the processor 330 may generate the first list of applications having the same types as those of applications that are frequently executed in the second split-screen area. Similarly, the processor 330 may generate the second list of applications having the same types as those of applications that are frequently executed in the third split-screen area.

The information of applications contained in the history stored in the memory 320 may include application manufacturer information. The application manufacturer information may include identification information indicating the manufacturer of each application. The processor 330 may generate the first list and/or the second list, based on the application manufacturer information. For example, the processor 330 may generate the first list of applications having the same manufacturers as those of applications that are frequently executed in the second split-screen area. Similarly, the processor 330 may generate the second list of applications having the same manufacturers as those of applications that are frequently executed in the third split-screen area.

The information of applications contained in the history stored in the memory 320 may include information about applications that have been executed together. For example, when the document editing application and the document viewer application have been simultaneously executed, the history may record the split-screen area where each of both applications has been executed, and identification information of each of both applications simultaneously executed.

The processor 330 may generate the first list and/or the second list, based on the information of applications that have been executed together. For example, the processor 330 may identify a current application (e.g., the document editing application) being executed in the first split-screen area and also identify another application (the document viewer application) that have been frequently or recently executed together with the current application. Thereafter, the processor 330 may generate the first or second list to contain the identified another application. The first list or the second list may omit the current application being executed in the first split-screen area.

The information of applications contained in the history stored in the memory 320 may include context information of applications used at the time when the first list or the second list was previously generated.

The context information may include information of applications frequently used by the user at the time when the first list or the second list was previously generated. The processor 330 may display the first list or the second list to include such frequently used applications indicated by the context information.

The context information may include location information of the electronic device 300, weather information, etc., at the time when the first list or the second list was previously generated. For example, the processor 330 may identify a first location of the electronic device 300 at the time when the first list or second list was previously generated, and also identify a second location where the electronic device 300 is currently located. If both locations are similar (e.g., the first location is a cafe A and the second location is a cafe B), the processor 300 may display the first list or the second list. As another example, when the current weather (e.g., rainy) is similar to the previous weather at the time when the first list or the second list was generated, the processor 330 may display the first or second list.

The electronic device 300 may be any type of electronic device including the display 310. For example, the electronic device 300 may be a smart phone, a tablet PC, a smart TV, or a consumer electric device having a display. Basically, the electronic device 300 may be any kind of electronic device capable of supporting a split-screen mode.

FIGS. 4A to 4D illustrate screenshots of an operation of displaying a list of executable applications on a split screen in an electronic device according to an embodiment.

Figure 4A:
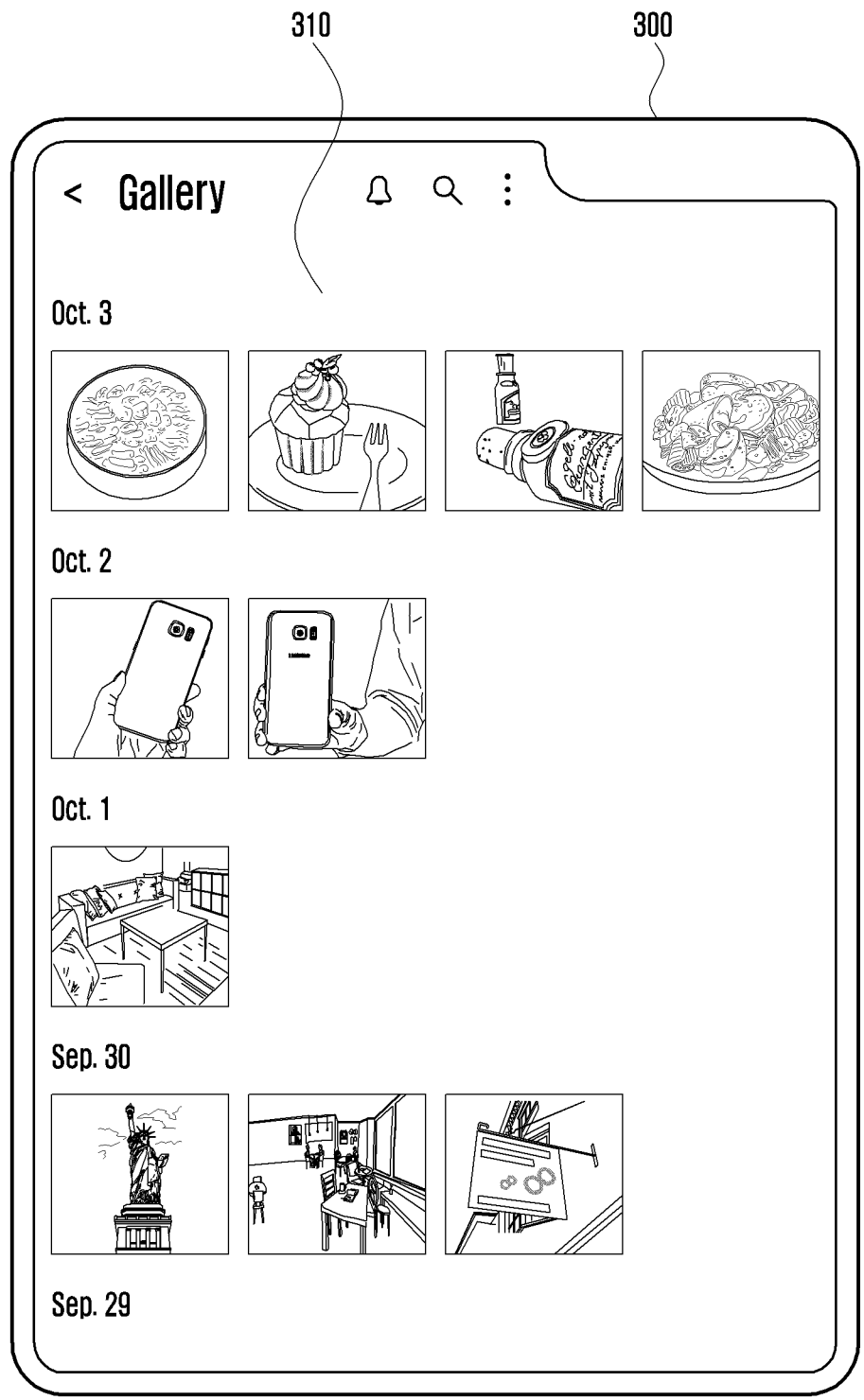
FIGS. 4A to 4D illustrate screenshots of an operation of displaying a list of executable applications on a split screen in an electronic device according to an embodiment.

Specifically, FIG. 4A illustrates a screenshot of the electronic device 300 operating in a full-screen mode.

Referring to FIG. 4A, when the electronic device 300 operates in the full-screen mode, the entire screen of the display 310 is used to display a scene of a single application (e.g., a gallery application), without dividing the screen of the display.

Figure 4B:
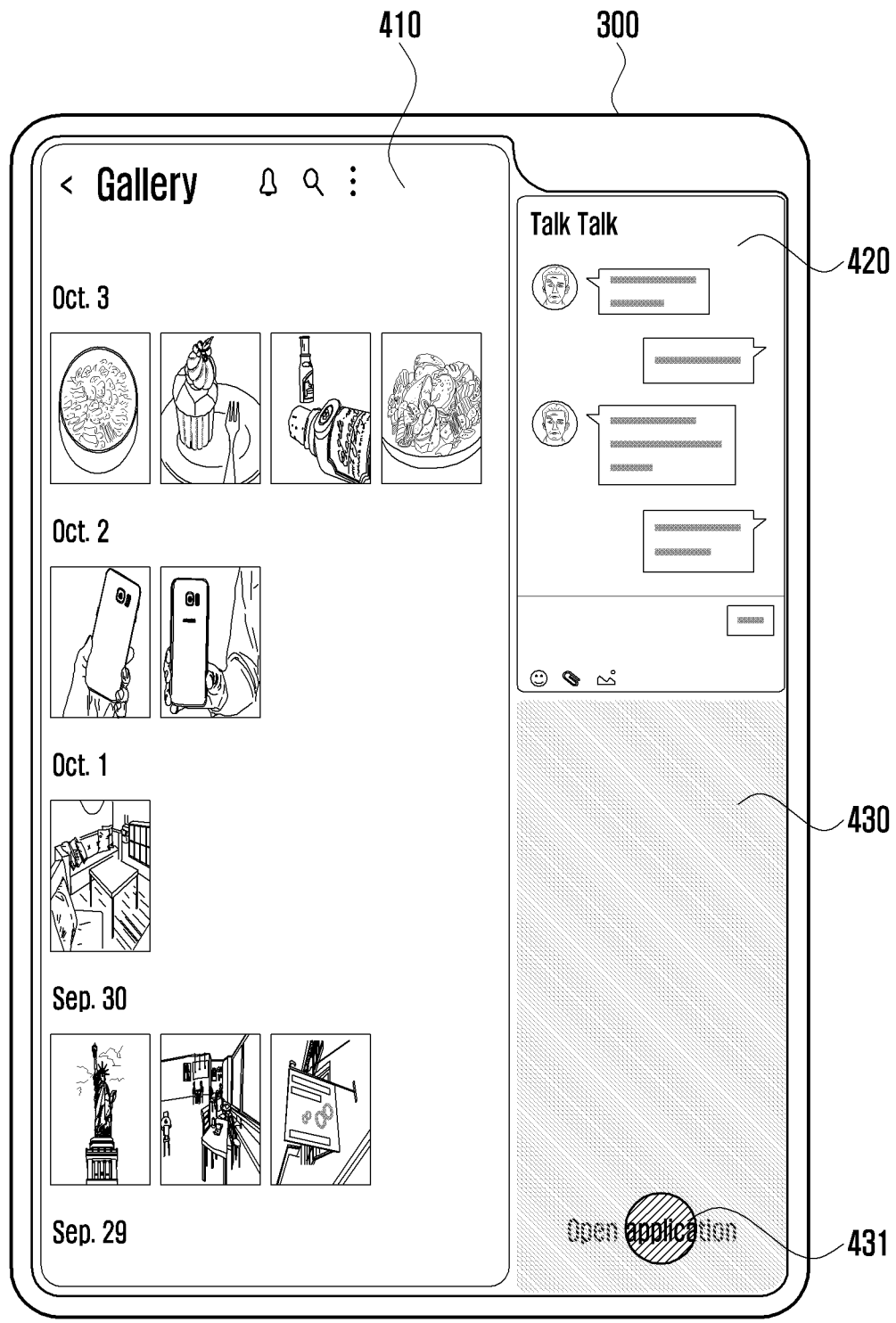

FIG. 4B illustrates a screenshot of the electronic device 300 operating in a split-screen mode.

Referring to FIG. 4B, when the electronic device 300 operates in the split-screen mode, the screen of the display 310 is divided into a first split-screen area 410, a second split-screen area 420, and a third split-screen area 430, and the electronic device 300 may display scenes of different applications in the split-screen areas, respectively. The electronic device 300 operating in the full-screen mode may enter the split-screen mode when receiving a user input for entry into the split-screen mode.

In the split-screen mode, the electronic device 300 may simultaneously execute two or more applications and control the display 310 to display a scene of each executed application in a corresponding split-screen area. For example, the electronic device 300 may execute the gallery application and control the display 310 to display the scene of the gallery application in the first split-screen area 410. In addition, the electronic device 300 may execute the SNS application and control the display 310 to display the scene of the SNS application in the second split-screen area 420.

When there is no application being executed in the third split-screen area 430, the electronic device 300 may display a button 431 for invoking a list of executable applications in the third split-screen area 430. When a user input selecting the button 431 is received, the electronic device 300 controls the display 310 to display the list (i.e., the second list) of applications that are executable in the third split-screen area 430.

Figure 4C:
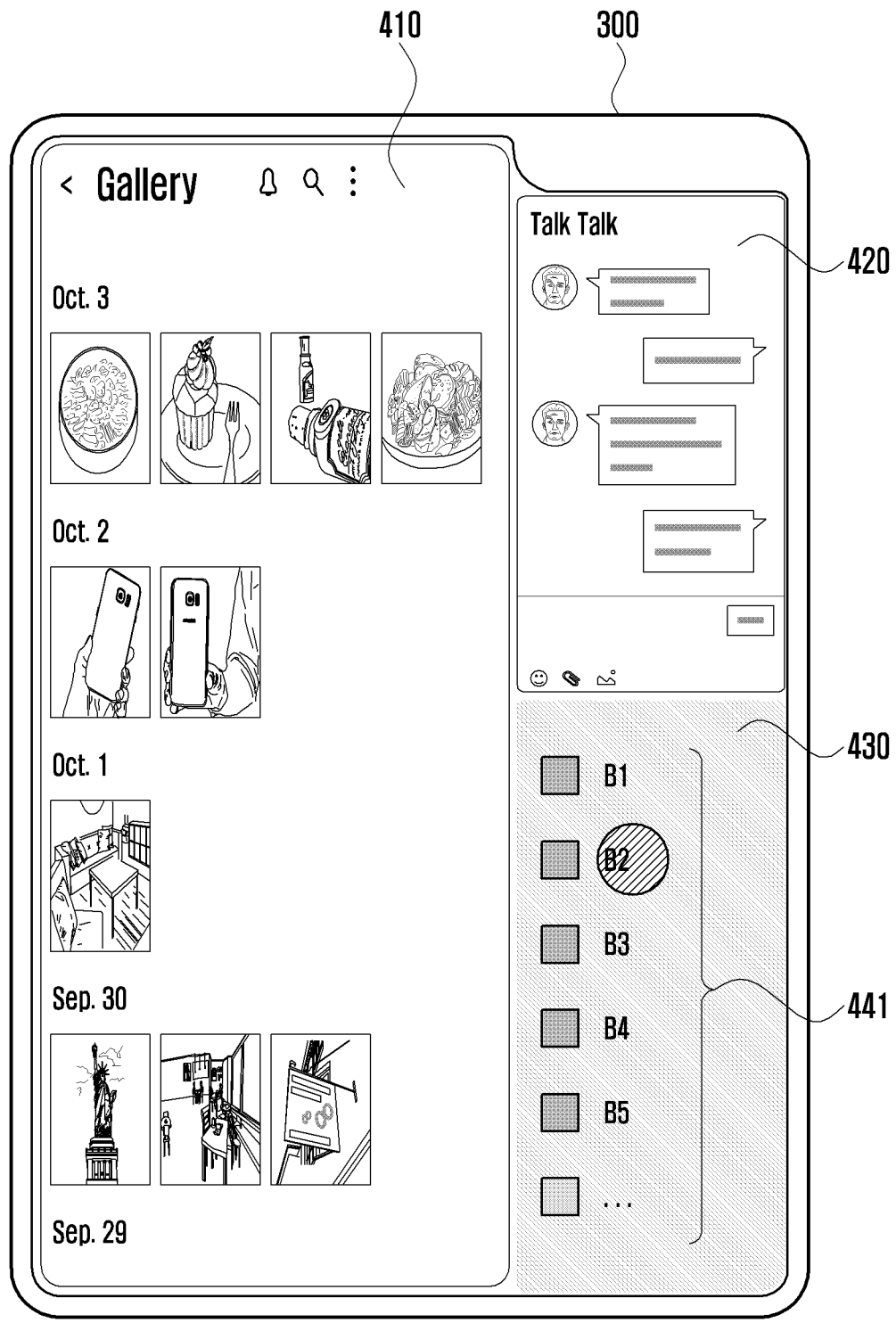

FIG. 4C illustrates a screenshot of the electronic device 300 displaying a list of executable applications in the split-screen mode.

Referring to FIG. 4C, when receiving a user input of selecting the button 431 in FIG. 4B, the electronic device 300 generates the second list 441 of applications being executable in the third split-screen area 430.

The electronic device 300 may generate the second list 441, based on the history stored in the memory 320. As described above, the history may record applications previously executed in the third split-screen area 430. Based on the history, the electronic device 300 may identify a particular number of applications that have been used for a relatively long time in the third split-screen area 430, a particular number of applications that are frequently used in the third split-screen area 430, or a particular number of applications most recently used in the third split-screen area 430. Thereafter, the electronic device 300 may generate the second list 441 to include the identified applications (e.g., B1, B2, B3, B4, B5, etc.).

The electronic device 300 may display the generated second list 441 in the third split-screen area 430. The electronic device 300 may receive a user input selecting a desired application (e.g., B2) from among the applications in the second list 441.

Figure 4D:
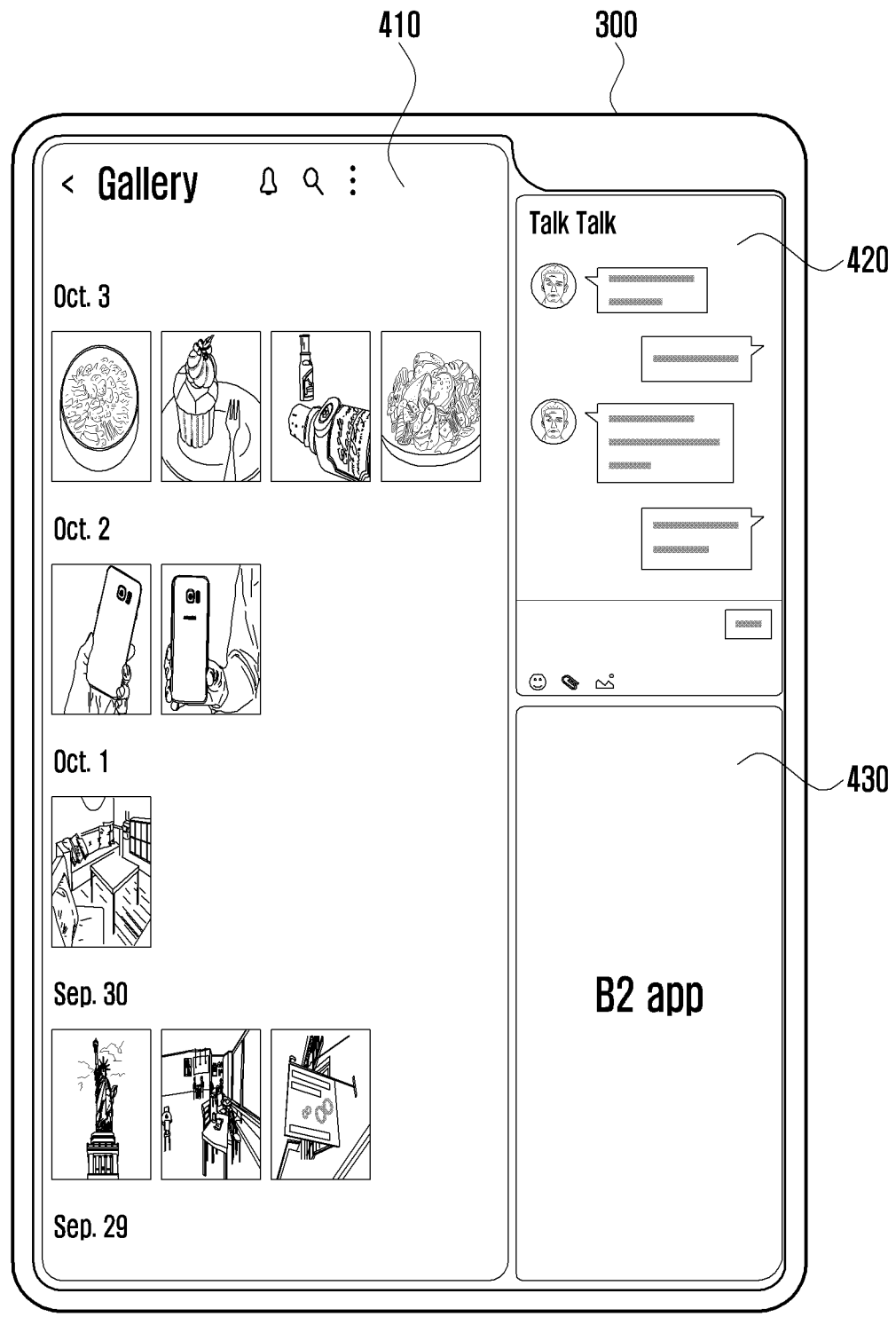

FIG. 4D illustrates a screenshot of the electronic device 300 displaying a scene of an application selected from the displayed list in the split-screen mode.

Referring to FIG. 4D, when receiving the user input of selecting a desired application (e.g., B2) from among the applications in the second list 441 in FIG. 4C, the electronic device 300 may execute the selected application and control the display to display a scene of the selected application in the third split-screen area 430.

As described above, the electronic device 300 may store history about applications used in the respective split-screen areas in the split-screen mode and generate a list of executable applications by using the stored history. Accordingly, a user who tends to execute the same applications in the same split-screen areas may easily find and execute a desired application in a desired split-screen area.

Figure 5A:
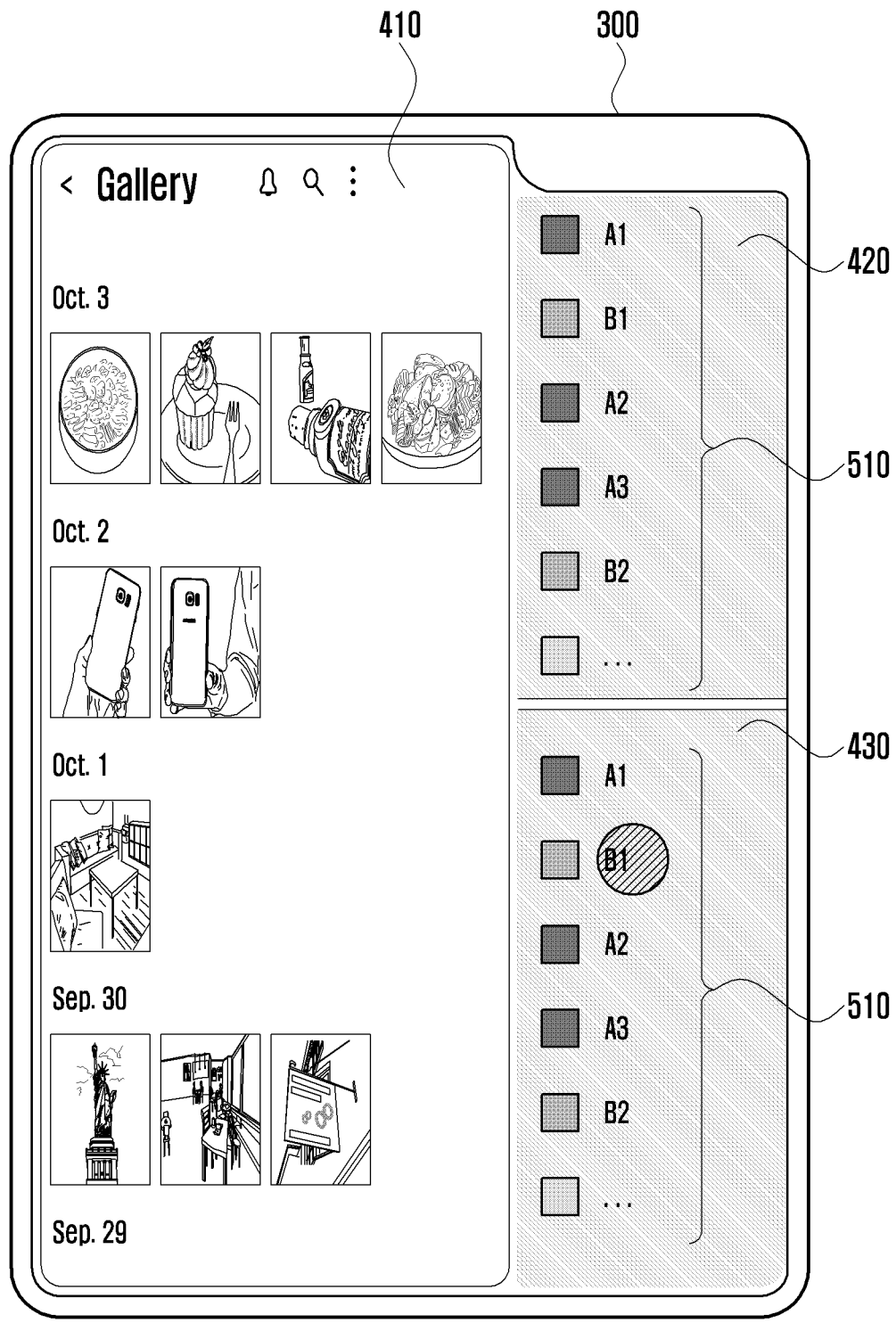
FIGS. 5A and 5B illustrate screenshots of an operation of displaying a list of executable applications in two schemes, based on a result of a comparison between a first list and a second list in an electronic device, according to an embodiment.
Figure 5B:
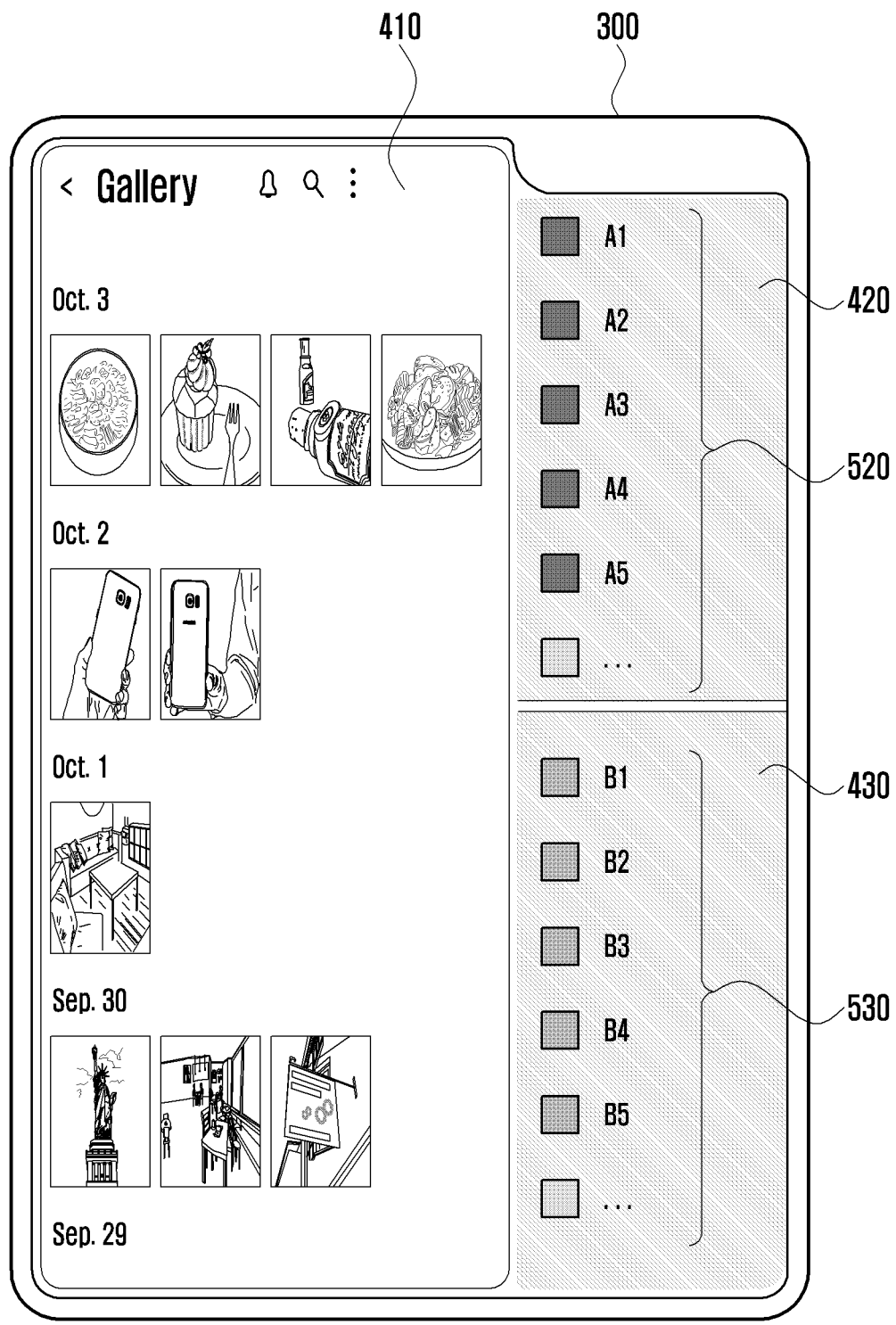

FIGS. 5A and 5B illustrate screenshots of an operation of displaying a list of executable applications in two schemes, based on a result of a comparison between a first list and a second list, in an electronic device according to an embodiment.

Considering a user who tends to execute applications regardless of the positions of the split-screen areas, i.e., executes applications in different split-screen areas, the electronic device 300 may generate a third list by combining the first and second lists and display the third list in both the second split-screen area and the third split-screen area.

The electronic device 300 may identify all applications contained in the first list of applications executable in the second split-screen area 420, identify all applications contained in the second list of applications executable in the third split-screen area 430, and count the number of particular applications contained in both the first list and the second list. Thereafter, based on the counted number, the electronic device 300 may determine whether to generate the third list combining the first list and the second list.

Referring to FIG. 5A, when the number of applications contained in both the first list and the second list is greater than or equal to a predetermined value, this may indicate that the user tends to execute applications in different split-screen areas. Therefore, in this case, the electronic device 300 may generate the third list 510 by combining the first and second lists and display the third list 510 in each of the second and third split-screen areas 420 and 430.

Referring to FIG. 5B, when the number of applications contained in both the first list and the second list is smaller than the predetermined value, this may indicate that the user tends to execute certain applications in certain split-screen areas. Therefore, in this case, the electronic device 300 may determine not to generate the third list. Accordingly, the electronic device 300 may display the first list 520 in the second split-screen area 420 and also display the second list 530 in the third split-screen area 430.

As described with reference to FIGS. 5A and 5B, the electronic device 300 may adopt two schemes of displaying a list of executable applications in the split-screen mode. Therefore, when a user tends to execute the same applications in the same split-screen areas, the user can easily find and execute a desired application in a desired split-screen area. However, when a user tends to execute applications in different split-screen areas, the third list can be provided so that the user can easily find and execute a desired application regardless of the split-screen area.

Applications contained in each of the first list 520, the second list 530, and the third list 510 may be arranged in the order of being used for a long time, being used frequently, or being used recently.

According to an embodiment of the disclosure, an electronic device may include a display; a memory that stores a history including information indicating a split-screen area in which a scene associated with an executed application is displayed in a split-screen mode for respectively displaying different scenes in split-screen areas of the display; a processor configured to, in response to execution of an application, display a first scene associated with the application on the display, in response to receiving a signal for entry into the split-screen mode, identify a first split-screen area for displaying a reduced scene of the first scene, and a plurality of split-screen areas including second and third split-screen areas obtained by dividing a remaining area other than the first split-screen area, generate a first list of applications to be displayed in the second split-screen area, based on the history, and display the first list in the second split-screen area.

The processor may be further configured to generate a second list of applications to be displayed in the third split-screen area, based on the history, and to display the second list in the third split-screen area.

The processor may be further configured to generate the first list to contain applications executed in the second split-screen area, and generate the second list to contain applications executed in the third split-screen area.

The processor may be further configured to compare applications contained in the first list with applications contained in the second list, and based on a number of applications contained in both the first list and the second list, to determine whether to combine the first list and the second list.

The processor may be further configured to, when the number of applications contained in both the first list and the second list is smaller than a predetermined value, display the first list in the second split-screen area and display the second list in the third split-screen area.

The processor may be further configured to, when the number of applications contained in both the first list and the second list is greater than or equal to a predetermined value, generate a third list by combining the first and second lists and display the third list in each of the second and third split-screen areas.

The history may include information about a type of an application executed for a predetermined period of time and information about a split-screen area where a scene associated with an executed application is output.

The processor may be further configured to generate the first list containing an application having a same type as a type of the application.

The first list and the second list may be displayed simultaneously.

The processor may be further configured to arrange the applications contained in each of the first list and the second list in order of being used for a long time, being used frequently, or being used recently.

The display may be a flexible display.

Figure 6:
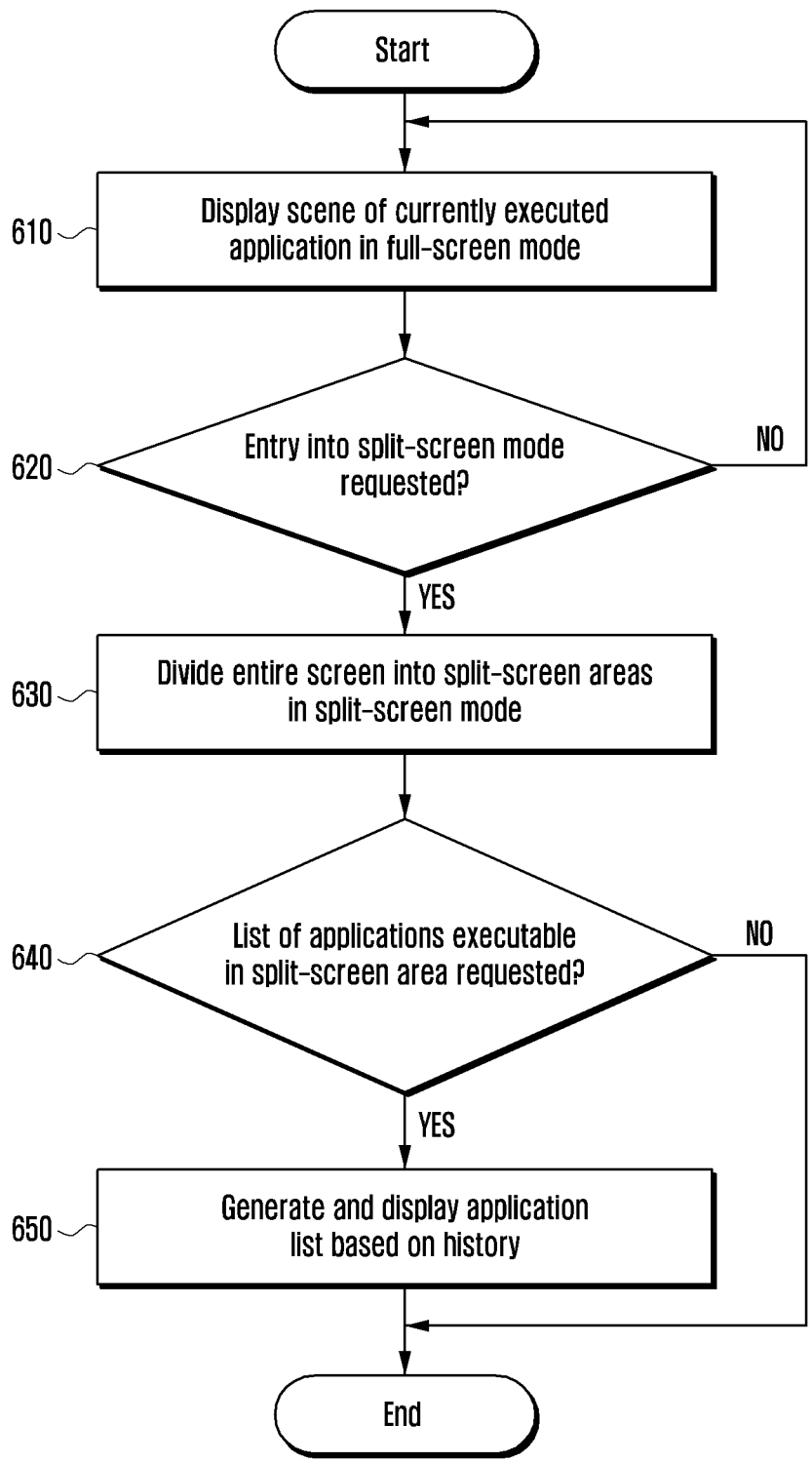
FIG. 6 is a flow diagram illustrating an operating method of an electronic device according to an embodiment.

FIG. 6 is a flow diagram illustrating an operating method of an electronic device according to an embodiment.

Referring to FIG. 6, at step 610, the electronic device displays a scene of a currently executed application in the full-screen mode. When operating in the full-screen mode, the electronic device may control the display to fully display a scene of a single application without dividing the entire screen of the display.

At step 620, the electronic device determines whether a user input requesting entry into the split-screen mode is received. This user input may be a menu selection, an icon selection, a key press, a button press, a voice command, a gesture command, or any other type command.

When receiving the user input for entry into the split-screen mode at step 620, the electronic device enters the split-screen mode at step 630. In the split-screen mode, the screen of the display is divided into a plurality of split-screen areas and scenes of different applications are displayed respectively in the split-screen areas.

If there is no user input for entry into the split-screen mode at step 620, the electronic device maintains the full-screen mode at step 610.

At step 630, the electronic device 300 divides the screen of the display 310 into a plurality of split-screen areas, e.g., a first split-screen area 410, a second split-screen area 420, and a third split-screen area 430 as illustrated in FIG. 4B. As described above, the sizes of the split-screen areas may be different from each other, and also the number of and the sizes of the split-screen areas may vary according to a designer's intention.

In the split-screen mode, the electronic device may reduce in size the scene of the current application being executed in the full-screen mode and display the reduced scene in the first split-screen area 410. If there is another application being executed simultaneously, the electronic device may display a scene of the application in a corresponding one of the second split-screen area 420 and the third split-screen area 430. For example, when an SNS application is being executed, as illustrated in FIG. 4B, the electronic device may display the scene of the SNS application in the second split-screen area 420.

At step 640, the electronic device determines whether a user input that requests a list of applications executable in the split-screen area is received.

For example, when there is no application being executed in the third split-screen area 430 as illustrated in FIG. 4B, the electronic device may display a button 431 for invoking a list of executable applications in the third split-screen area 430. Thereafter, the electronic device may receive a user input of selecting the button 431. Similarly, when there is no application being executed in the second split-screen area 420, the electronic device may display a button for invoking a list of executable applications in the second split-screen area 420 and then receive a user input of selecting the button.

At step 650, in response to the received user input, the electronic device generate a list of applications executable in the split-screen area, based on a history stored in a memory, and displays the generated list.

For example, when receiving a user input of selecting the button 431 as illustrated in FIG. 4B, the electronic device may generate the second list 441 of applications being executable in the third split-screen area 430 as illustrated in FIG. 4C, Similarly, when receiving a user input selecting the button displayed in the second split-screen area 420, the electronic device may generate the first list of applications being executable in the second split-screen area 420.

The electronic device may generate the first list, based on the stored history. As described above, the history may record applications previously executed in the second split-screen area 420. Based on the history, the electronic device may identify a particular number of applications that have been used for a relatively long time in the second split-screen area 420, a particular number of applications relatively frequently used in the second split-screen area 420, or a particular number of applications relatively recently used in the second split-screen area 420. The electronic device may generate the first list to include the identified applications.

Similarly, the electronic device may generate the second list, based on the stored history that records applications previously executed in the third split-screen area 430.

According to an embodiment, a method of an electronic device includes, in response to execution of an application, displaying a first scene associated with the application on a display; in response to receiving a signal for entry into a split-screen mode, identifying a first split-screen area for displaying a reduced scene of the first scene, and a plurality of split-screen areas including second and third split-screen areas obtained by dividing a remaining area other than the first split-screen area; generating a first list of applications to be displayed in the second split-screen area, based on a history that includes information indicating a split-screen area where a scene associated with an executed application is displayed; and displaying the first list in the second split-screen area.

The method may further include generating a second list of applications to be displayed in the third split-screen area, based on the history; and displaying the second list in the third split-screen area.

The first list may contain applications executed in the second split-screen area, and the second list may contain applications executed in the third split-screen area.

The method may further include comparing applications contained in the first list with applications contained in the second list; and based on a number of applications contained in both the first list and the second list, determining whether to combine the first list and the second list.

The method may further include, when the number of applications contained in both the first list and the second list is smaller than a predetermined value, displaying the first list in the second split-screen area and displaying the second list in the third split-screen area.

The method may further include, when the number of applications contained in both the first list and the second list is greater than or equal to a predetermined value, generating a third list by combining the first and second lists and displaying the third list in each of the second and third split-screen areas.

The history may include information about a type of an application executed for a predetermined period of time and information about a split-screen area in which a scene associated with an executed application is output.

The generating the first list may include generating the first list containing an application having a same type as a type of the application.

The applications contained in each of the first list and the second list may be arranged in order of being used for a long time, being used frequently, or being used recently.

An electronic device according to an embodiment may include a portable communication device (e.g., a smartphone), a computer device, a portable multimedia device, a portable medical device, a camera, a wearable device, or a home appliance. The electronic device is not limited to those described above.

The embodiments described in the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, such as "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
a memory that stores applications and a history comprising first information indicating split-screen areas in which screens associated with executed applications are respectively displayed in a split-screen mode; and
a processor configured to:
receive an execution instruction to execute a first application among the applications;
in response to receiving the execution instruction, display, on the display, a first screen associated with the first application being executed,
receive a first user input for entry into the split-screen mode;
in response to receiving the first user input, identify a first split-screen area for displaying a reduced screen of the first screen, and identify a second split-screen area and a third split-screen area obtained by dividing a remaining area of the display other than the first split-screen area,
receive a second user input for displaying a first list of the applications on the second split-screen area;
in response to receiving the second user input:
identify a frequency of execution of each of the applications on the second split-screen area based on the first information,
identify a first subset of the applications to be included in the first list based on the identified frequency,
generate the first list of the applications based on the identified first subset of the applications, wherein the first list of the applications includes a second application having a same type of the identified first subset of the applications;
identify an execution history of each of the applications on the third split-screen area based on the first information, identify a second subset of the applications to be included in a second list of the applications based on the identified execution history, generate the second list of the applications based on the identified second subset of the applications;

compare the applications included in the first list of the applications with the applications included in the second list of the applications;

in response to the comparison, determine a number of the applications that are included in both the first list of the applications and the second list of the applications, wherein:

in response to the determined number of the applications included in both the first list of the applications and the second list of the applications being greater than or equal to a predetermined threshold amount of applications:

generate a third list of the applications that includes the first list of the applications and the second list of the applications, and display the third list of the applications in the second split-screen area and in the third split-screen area; and in response to the determined number of the applications included in both the first list of the applications and the second list of the applications being smaller than the predetermined threshold amount of applications:

determine not to generate the third list of the applications, display the first list of the applications in the second split-screen area, and display the second list of the applications in the third split-screen area.

2. The electronic device of claim 1, wherein, when the determined number of the applications included in both the first list of the applications and the second list of the applications is smaller than the predetermined threshold amount of applications, the first list of the applications and the second list of the applications are displayed simultaneously.

3. The electronic device of claim 1, wherein the processor is further configured to arrange the applications included in the second list of the applications in an order based on time of use, based on frequency of use, or based on recent use.

4. The electronic device of claim 1, wherein the history further comprises second information about a type of the applications executed for a predetermined period of time.

5. The electronic device of claim 1, wherein the display is a flexible display.

6. A method of an electronic device, the method comprising:

receiving an execution instruction to execute a first application among the applications;

in response to receiving the execution instruction, displaying, on a display, a first screen associated with the first application being executed;

receiving a first user input for entry into a split-screen mode;

in response to receiving the first user input, identifying a first split-screen area for displaying a reduced screen of the first screen, and identifying a second split-screen area and a third split-screen area obtained by dividing a remaining area of the display other than the first split-screen area;

receiving a second user input for displaying a first list of the applications on the second split-screen area;

in response to receiving second user input:

identifying a frequency of execution of each of the applications on the second split-screen area based on a history comprising first information indicating split-screen areas in which screens associated with executed applications are respectively displayed in the split-screen mode;

identifying a first subset of the applications to be included in the first list of the applications based on the identified frequency;

generating the first list of the applications based on the identified first subset of the applications, wherein the first list of the applications includes a second application having a same type of the identified first subset of the applications;

identifying an execution history of each of the applications on the third split-screen area based on the first information, identifying a second subset of the applications to be included in a second list of the applications based on the identified execution history, generating the second list of the applications based on the identified second subset of the applications;

comparing the applications included in the first list of the applications with the applications included in the second list of the applications;

in response to the comparison, determininq a number of the applications that are included in both the first list of the applications and the second list of the applications, wherein:

in response to the determined number of the applications included in both the first list of the applications and the second list of the applications being greater than or equal to a predetermined threshold amount of applications:

generating a third list of the applications that includes the first list of the applications and the second list of the applications, and displaying the third list of the applications in the second split-screen area and in the third split-screen area; and in response to the determined number of the applications included in both the first list of the applications and the second list of the applications being smaller than the predetermined threshold amount of applications:

determininq not to qenerate the third list of the applications, displaying the first list of the applications in the second split-screen area, and displaying the second list of the applications in the third split-screen area.

7. The method of claim 6, wherein the applications included in the second list of the applications are arranged in an order based on time of use, based on frequency of use, or based on recent use.

8. The method of claim 6, wherein the history further comprises second information about a type of the applications executed for a predetermined period of time.

* * * * *